(12) United States Patent
Natale et al.

(10) Patent No.: US 10,500,810 B2
(45) Date of Patent: Dec. 10, 2019

(54) DECORATIVE COVERING MATERIAL WITH ALIGNMENT FEATURES

(71) Applicant: Faurecia Interior Systems, Inc., Auburn Hills, MI (US)

(72) Inventors: Nicholas Natale, Sterling Heights, MI (US); Brad Kusky, Swartz Creek, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/940,061

(22) Filed: Mar. 29, 2018

(65) Prior Publication Data
US 2019/0299559 A1  Oct. 3, 2019

(51) Int. Cl.
| | |
|---|---|
| *B32B 3/06* | (2006.01) |
| *B32B 9/02* | (2006.01) |
| *B32B 7/12* | (2006.01) |
| *D05B 93/00* | (2006.01) |
| *B32B 7/08* | (2019.01) |
| *B60R 21/04* | (2006.01) |
| *B60R 13/02* | (2006.01) |

(52) U.S. Cl.
CPC ................. *B32B 3/06* (2013.01); *B32B 7/08* (2013.01); *B32B 7/12* (2013.01); *B32B 9/025* (2013.01); *D05B 93/00* (2013.01); *B32B 2250/02* (2013.01); *B32B 2451/00* (2013.01); *B32B 2605/003* (2013.01); *B60R 13/02* (2013.01); *B60R 13/0243* (2013.01); *B60R 21/04* (2013.01); *D05D 2305/08* (2013.01); *D10B 2505/12* (2013.01); *Y10T 428/192* (2015.01); *Y10T 428/24033* (2015.01); *Y10T 428/24777* (2015.01)

(58) Field of Classification Search
CPC ......... Y10T 428/192; Y10T 428/24033; Y10T 428/24777; B32B 3/06; B32B 7/08; B32B 9/025; B32B 2605/003; B60R 21/04; B60R 13/02; B60R 13/0243
See application file for complete search history.

(56) References Cited

U.S. PATENT DOCUMENTS

| | | |
|---|---|---|
| 5,962,089 A | 10/1999 | Jones et al. |
| 6,099,938 A | 8/2000 | Stoyanovich |

FOREIGN PATENT DOCUMENTS

| | | | |
|---|---|---|---|
| CN | 203715975 U | 7/2014 | |
| FR | 2205413 A1 * | 5/1974 | ......... B29C 63/0043 |

* cited by examiner

*Primary Examiner* — Alexander S Thomas
(74) *Attorney, Agent, or Firm* — Reising Ethington P.C.

(57) ABSTRACT

A decorative covering for a vehicle interior panel is made from two sheets of material joined together at a seam. The sheets of material have matching alignment features along respective edges to aid in visual alignment during the joining operation. The alignment features are spaced along the edge of a decorative layer, and cutouts are formed along a corresponding edge of an attached backing layer such that each alignment feature is visible through one of the cutouts when viewed from the back side. The cutouts are larger than the alignment features and formed before the two layers are laminated together, effectively increasing allowable tolerances during lamination. This construction is particularly useful with leather, which is often subjected to cut-and-sew operations and used with a backing layer.

20 Claims, 2 Drawing Sheets

DECORATIVE COVERING MATERIAL WITH ALIGNMENT FEATURES

TECHNICAL FIELD

The present disclosure relates generally to materials used in vehicle interiors and is particularly pertinent to decorative covering materials that are sewn or pieced together before installation.

BACKGROUND

Decorative coverings are used in vehicle interiors to provide a desirable aesthetic for vehicle occupants and are usually applied over less attractive structural or functional components of the vehicle, effectively concealing such components from view while providing the occupants with a feeling of comfort. Decorative coverings are made from many different types of materials, such as textile fabrics, leather, imitation leather, polymer-based films, or combinations thereof, and can include any of a variety of textures, shapes, colors, patterns, and other aesthetic characteristics.

Leather is often considered a premium material, in part because of the additional costs incurred when working with leather in a vehicle component manufacturing environment. For example, while many manufacturing processes can be and have been automated, manufacturing operations such as sewing separate pieces of material together continue to be performed by human operators, whose ability to visually monitor the operation and continually make manual adjustments has not been replicated by any type of cost-effective automation.

Chinese utility model CN 203715975 by Wang et al. discloses an automated method for aligning an edge of an imitation leather material with an edge of a release liner during a lamination process in which the two materials are laminated together. Each material is provided in roll stock form, and the lamination process is a continuous one. The process uses a vision system to monitor edge alignment and moves the roll stock material from side-to-side to correct any misalignment during the continuous process. There is no disclosure regarding alignment of the edge of the laminated material with an edge of a different material while forming a seam in a joining operation.

SUMMARY

In accordance with various embodiments, a sheet of material for use in making a decorative covering for a vehicle interior panel includes a decorative layer, a backing layer, a plurality of alignment features, and a plurality of cutouts. The decorative layer has a decorative side, an opposite back side, and an edge extending along a perimeter of the sheet of material. The backing layer is attached to the back side of the decorative layer and has a corresponding edge extending along the edge of the decorative layer. The alignment features are spaced along the edge of the decorative layer in an edgewise pattern. The plurality of cutouts is formed along the corresponding edge of the backing layer. Each cutout is located such that each alignment feature is visible through one of the cutouts when the sheet of material is viewed from the back side. The sheet of material forms a portion of the decorative covering when joined at a seam with another different sheet of material having alignment features spaced in a matching edgewise pattern along an edge of the different sheet of material.

In some embodiments, each alignment feature along the edge of the decorative layer is a notch.

In some embodiments, each cutout has a shape different from a shape of each alignment feature that is visible therethrough.

In some embodiments, each cutout has a width greater than a width of each alignment feature that is visible therethrough.

In some embodiments, each cutout has a width that is at least twice a width of each alignment feature that is visible therethrough.

In some embodiments, each cutout has a width that is at least three times and no more than five times a width of each alignment feature that is visible therethrough.

In some embodiments, each cutout has a depth equal to a depth of each alignment feature that is visible therethrough.

In some embodiments, each cutout has a projected area that is at least twice a projected area of each alignment feature that is visible therethrough.

In some embodiments, each cutout has a projected area that is at least five times and not more than ten times a projected area of each alignment feature that is visible therethrough.

In some embodiments, the decorative layer is leather.

In some embodiments, the backing layer is adhered to the back side of the decorative layer.

In some embodiments, the alignment features and the cutouts are arranged along a curvilinear portion of the perimeter of the sheet of material.

In some embodiments, a vehicle interior panel includes a decorative covering formed from the sheet of material joined with a different sheet of material at a seam with each of the sheets of material being on opposite sides of the seam.

In some embodiments, a method of making a decorative covering for a vehicle interior panel includes the steps of sewing the sheet of material to a different sheet of material, and aligning the alignment features of the decorative layer with the alignment features of said different sheet of material during the step of sewing.

In some embodiments, the backing layer is attached to the back side of the decorative layer before the step of sewing, and the alignment features are formed along the edge of the decorative layer and the cutouts are formed along the corresponding edge of the backing layer before the backing layer is attached to the back side of the decorative layer.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENTS

Described below is a material construction that is useful to enhance the utility of alignment features used to join separate pieces of material together at a seam. The separate pieces have matching alignment features along the edges to be joined to aid in visual alignment during the joining operation. When the material is a multi-layer material, the alignment features can be formed in one layer with cutouts formed in an overlapped layer so the alignment features are visible through the cutouts. This material construction offers benefits over constructions having alignment features formed through all layers of the multi-layer material and is described below as part of a decorative covering for a vehicle interior panel. The disclosed constructions and techniques may be useful in other products as well, such as furniture upholstery or clothing.

Figure 1:
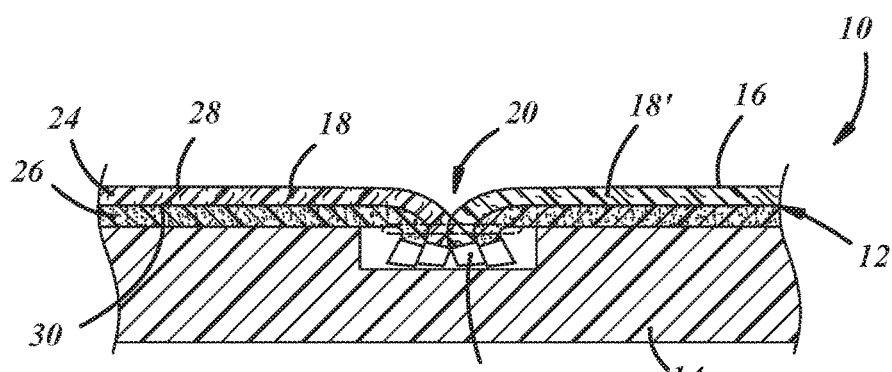
FIG. 1 is a cross-sectional view of a portion of a vehicle interior panel, including a decorative covering with a sewn seam.

FIG. 1 is a cross-sectional view of a portion of an exemplary vehicle interior panel 10, including a decorative covering 12 overlying a substrate 14. Non-limiting examples of vehicle interior panels include an instrument panel, door panel, console lid, pillar cover, steering wheel panel, or seat panel, to name a few. The decorative covering 12 has a decorative side 16 that visibly faces the interior of a passenger cabin of a vehicle when installed in the vehicle. The underlying substrate 14 may be a structural and/or functional component that provides the overall shape and contour of the panel 10. In an exemplary instrument panel, the substrate 14 may be formed from a filled thermoplastic material, such as a glass-filled polypropylene alloy, with a thickness between 2 mm and 4 mm. Smaller and/or less structural panels may include a substrate molded from an unfilled thermoplastic, such as TPO or ABS. Where the decorative covering 12 provides a seating surface, the substrate 14 may be or may include a foam cushion.

The decorative covering 12 is formed from two separately provided sheets of material 18, 18' joined together at a sewn seam 20. In the example of FIG. 1, the seam 20 is a plain seam with the margin or free edges 22 of the sheets of material 18, 18' located in a recess provided in the substrate 14 to minimize any apparent bulge at the visible side of the seam. In other non-limiting examples, the substrate recess is omitted and the free edges 22 are trimmed shorter prior to assembly with the substrate 14, each free edge is folded back under and sewn to its respective sheet of material to form a French seam, or both free edges are folded in the same direction under one of the sheets of material and sewn to form a deck seam. While the exemplary seams illustrated herein are formed by sewing and include sewing thread extending through the joined sheets of material, the disclosed material construction is also useful for sheet alignment during formation of seams in other types of joining operations, such as heat sealing, ultrasonic edge welding, or adhesive joining.

An illustrative sheet of material 18 is a multi-layer material, including a decorative layer 24 and a backing layer 26. The decorative layer 24 has a decorative side 28 and an oppositely facing back side 30, with the decorative side 28 providing a portion of the decorative side 16 of the assembled covering 12. The backing layer 26 is attached to the back side 30 of the decorative layer 24, via lamination and/or an adhesive layer, for example. Each of the decorative layer 24 and the backing layer 26 may itself include multiple layers. In a particular example, the decorative layer 24 is leather or imitation leather. The backing layer 26 may be a spacer fabric or a foam layer and generally provides an elastic cushioning effect between the decorative layer 24 and the substrate 14 to provide a more luxurious feeling when touched by vehicle occupants. The decorative layer 24 could also be a polymer-based film layer. The disclosed configurations may be particularly suitable for leather decorative layers, in part because commercially available polymeric decorative layers often include a pre-laminated backing layer.

Figure 2:
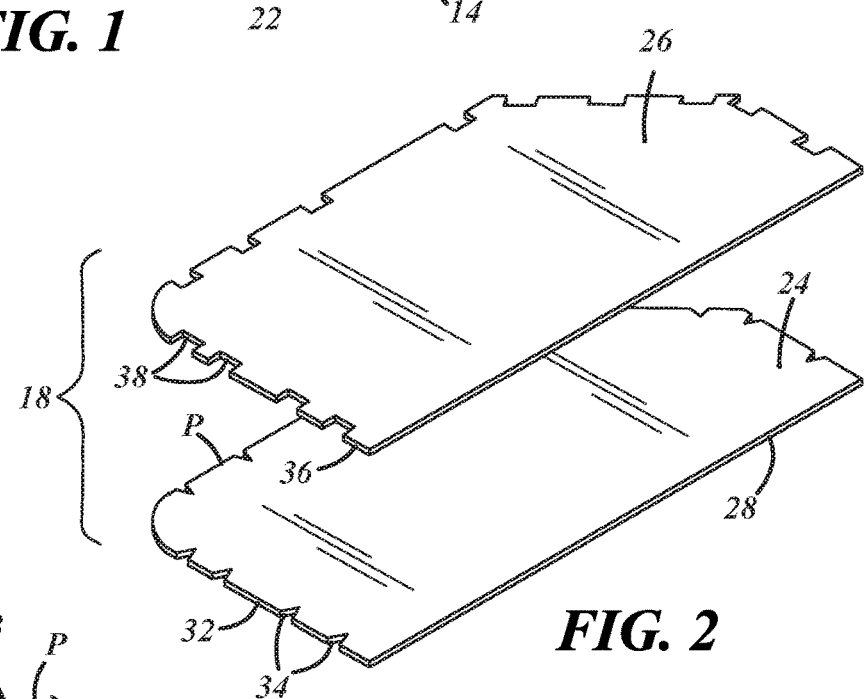
FIG. 2 is an exploded view of a sheet of material that includes a decorative layer and a backing layer and can be used to form the decorative covering of FIG. 1.
Figure 3:
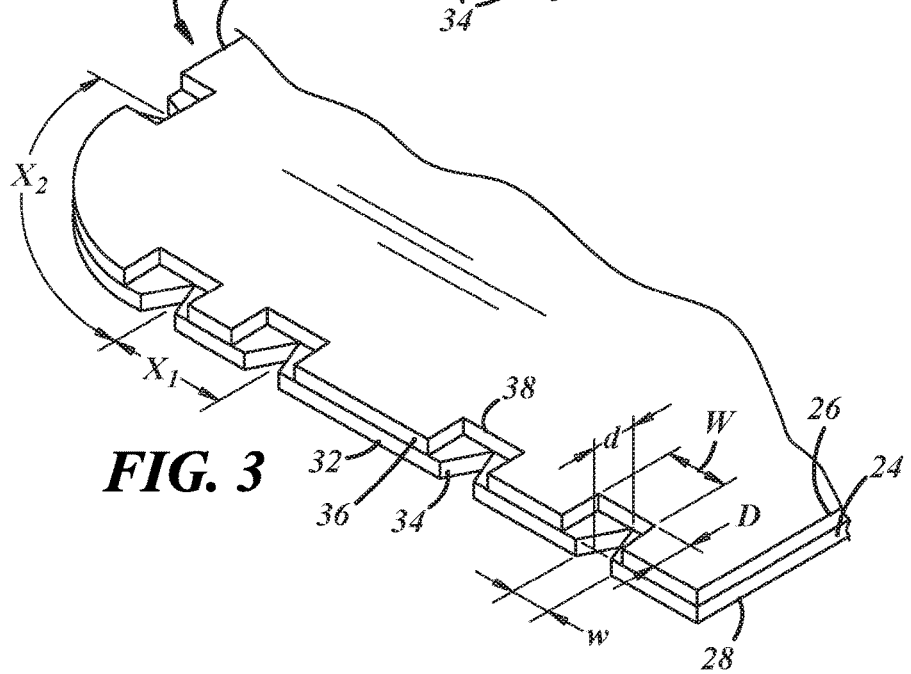
FIG. 3 is an enlarged view of a portion of the sheet of material of FIG. 2, illustrating alignment features in the decorative layer and cutouts in the backing layer.

FIG. 2 is an exploded view of an exemplary sheet of material 18, and FIG. 3 is an enlarged isometric view of a portion of the sheet of material. The sheet of material 18 is illustrated with the decorative side 28 face-down and has an outer perimeter P within which both layers 24, 26 fit. The decorative layer 24 has an edge 32 extending along the perimeter P of the sheet of material 18, and alignment features 34 are provided along the edge of the decorative layer in an edgewise pattern. An edgewise pattern is defined by a particular and ordered center-to-center spacing ($X_1$, $X_2$ ... $X_n$) between each individual pair of adjacent alignment features 34 as measured along the edge 32 in the plane of the decorative layer 24. The backing layer 26 has a corresponding edge 36 extending along the edge 32 of the decorative layer 24, and cutouts 38 are provided along the edge of the backing layer. The cutouts 38 are located such that each alignment feature 34 is visible through one of the cutouts when the sheet of material 18 is viewed from the back side, as in FIG. 3.

In the illustrated example, each alignment feature 34 is in the form of a V-shaped notch formed through the thickness of the decorative layer 24. The cutouts 38 are U-shaped and arranged in generally the same edgewise pattern as the alignment features 34 so that a single alignment feature is visible through each one of the cutouts. It is also possible that more than one alignment feature 34 is visible through a single cutout 38, such as where alignment features are relatively closely spaced along a curved edge, for example. The illustrated shapes of the alignment features 34 and cutouts 38 are non-limiting. The cutouts 38 are generally larger and/or have a different shape than the alignment features 34 to facilitate alignment feature visibility. For example, a width (W), depth (D), and/or projected area of each cutout 38 may be greater than that of a corresponding alignment feature 34. In some embodiments, the alignment features 34 are formed with no material removed from the edge 32 of the decorative layer 24. For example, each alignment feature 34 may be in the form of a slit or a visible mark formed along the edge 32 of the decorative layer 24 and visible through one of the cutouts 38.

As illustrated in FIG. 3, each cutout 38 may have a width (W) that is greater than a width (w) of each corresponding visible alignment feature 34. In one embodiment, the width of each cutout 38 is at least twice the width of each corresponding alignment feature 34. In another embodiment, the width of each cutout 38 is in a range between three and five times the width of each corresponding alignment feature 34. For example, each cutout 38 may have a width of about 10 mm with each alignment feature having a width between 2 mm and 3 mm.

Also, each cutout 38 may have a projected area that is greater than a projected area of each alignment feature 34 that is visible through the respective cutout. In one embodiment, the projected area of each cutout 38 is at least twice the projected area of each corresponding alignment feature 34. In another embodiment, the projected area of each cutout 38 is in a range between five and ten times the projected area of each corresponding alignment feature 34. For example, each cutout 38 may have a projected area in a range from about 20 mm$^2$ to about 30 mm$^2$, and each alignment feature may have a projected area in a range from about 2 mm$^2$ to about 4.5 mm$^2$. In one non-limiting example, each alignment feature 34 is a symmetric V-shaped notch having a width (w) and a depth (d) of 2 mm or 3 mm, and the corresponding cutout 38 has a width (W) of 10 mm and a depth (D) the same as the alignment feature.

A benefit of the oversized cutouts 38 in the backing layer 26 is a larger processing window during lamination of the two separately formed layers 24, 26. In other words, if the cutouts 38 in the backing layer 26 are made in the same edgewise pattern, shape, and size as the alignment features 34 in the decorative layer 24, perfect alignment and registration of the two layers is required during lamination—i.e., without perfect alignment, the backing layer 26 will obscure at least a portion of each alignment feature 34 from view, defeating the utility of the alignment features in a subsequent joining process with another sheet of material. The effect of the disclosed cutouts 38 is apparent in FIG. 3, in which not all of the alignment features 34 are perfectly centered in the corresponding cutout 38. If the cutouts 38 of FIG. 3 were made in the same shape and size as the alignment features 34 with the illustrated cutout spacing, some of the alignment features 34 would be at least partially blocked from view. Worse yet, the sewing operator would be inclined to use the improperly located cutouts as the alignment features during the sewing or other joining operation, leading to misaligned decorative layers in the finished decorative covering.

Providing alignment features 34 in the decorative layer 24 and separately providing oversized cutouts 38 in the backing layer 26 prior to laminating the layers together to form the sheet of material 18 also provides some benefit over forming the alignment features in an already laminated sheet of material. In particular, at least one cutting step may be eliminated, along with the cost of a cutting tool. A method of making the disclosed sheet of material 18 includes the steps of die-cutting the decorative layer 24 and alignment features 34 from a sheet of decorative material to the desired outer shape, die-cutting the backing layer 26 and cutouts 38 from a sheet of backing material to the same outer shape, and then laminating the two layers together to form the sheet of material 18 with the alignment features 34 visible through the cutouts 38. This method requires only two die-cutting steps, and therefore only two cutting dies. A process in which the layers 24, 26 are first laminated together before cutting the alignment features through both layers requires at least three cutting operations and corresponding dies. In such a process, each of the decorative material and the backing material must first be separately rough-cut to a shape slightly larger than the desired final shape, then laminated together before a third precision die-cutting step forms the alignment features through the laminated material.

Figure 4:
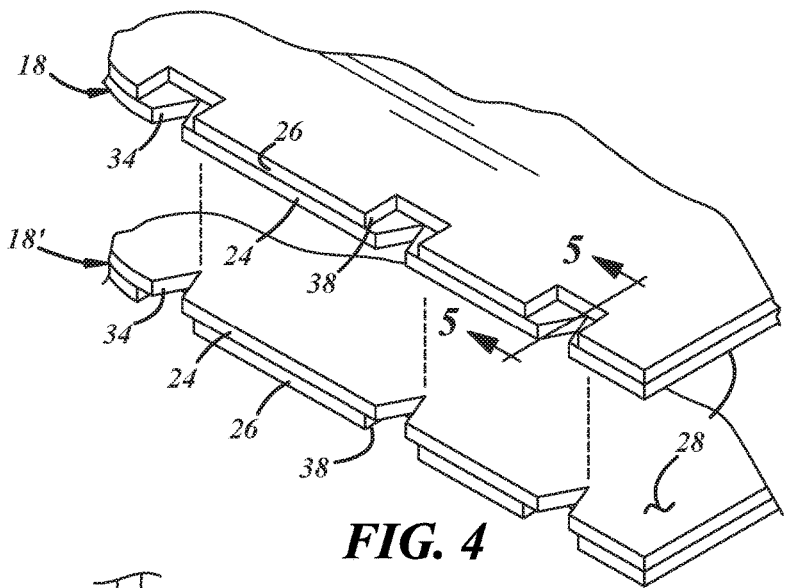
FIG. 4 illustrates the sheet of material of FIG. 3 along with a second sheet of material having a matching pattern of alignment features.
Figure 5:
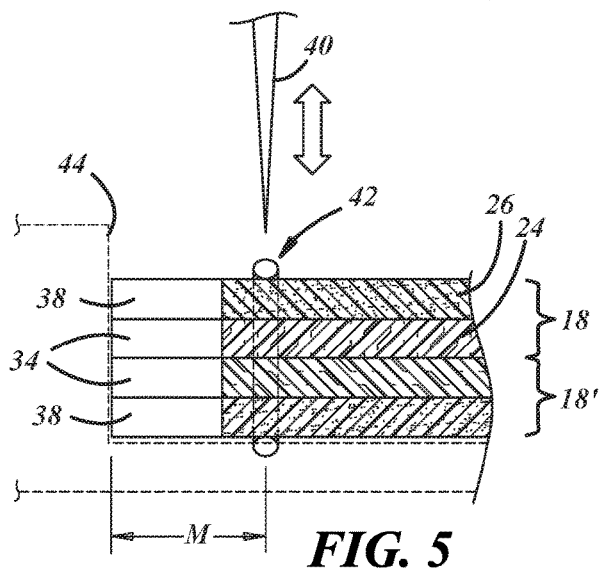
FIG. 5 is a cross-sectional view of the two sheets of material of FIG. 4 during a joining operation.
Figure 6:
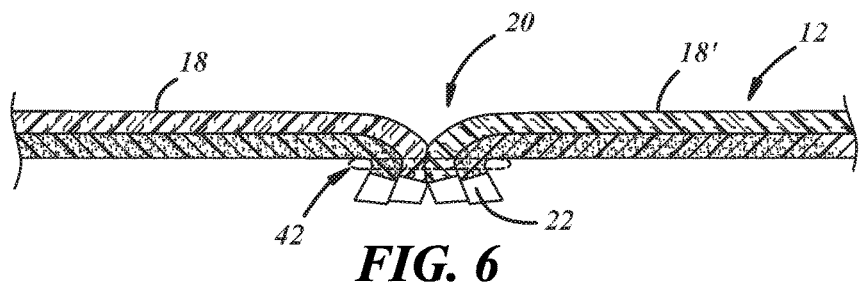
FIG. 6 is the decorative covering resulting from the joining operation of FIG. 5 and illustrated as part of the vehicle interior panel of FIG. 1.

FIGS. 4-6 illustrate the sheet of material 18 of FIGS. 2 and 3 in various stages of formation of the decorative covering 12. FIG. 4 is an isometric view of a portion of the sheet of material 18 of FIGS. 2 and 3 aligned over a portion of a second sheet of material 18'. Both sheets of material 18, 18' are constructed in generally the same manner in this example, with alignment features 34 along the edge of each decorative layer 24 in matching edgewise patterns and oversized cutouts 38 in each backing layer 26. The cutouts 38 need only be oversized in one of the sheets of material 18, 18'—i.e., whichever sheet of material has its back side visible during the joining process.

FIG. 5 is a cross-sectional view of the two sheets of material 18, 18' being joined together in a sewing operation with a sewing needle 40 schematically illustrated. The two sheets are brought together face-to-face with their decorative sides 28 facing each other, and a line of stitching 42 is formed at the desired seam location. The sheets of material may be supported from the side opposite the visible or sewing needle side by a table or other fixture (shown in phantom), which may include a guide 44 along which the edges of the materials can be moved to maintain the desired margin length (M) and seam position. The cross-section of FIG. 5 is taken through the alignment features 34 and cutouts 38 of each sheet of material, which have equal depths in this example. FIG. 5 illustrates a possible practical limitation on the depths of the alignment features 34 and cutouts 38: they should be less than the desired margin length (M). In one embodiment, the margin length is about twice the depth of the alignment features and/or the cutouts. For example, the depths of the alignment features and cutouts may be in a range between 2 mm and 3 mm, and the margin length may be in a range between 4 mm and 6 mm.

FIG. 5 also indirectly illustrates a benefit of limiting the width of the cutouts 38. While a larger cutout width provides larger alignment tolerances with the decorative layer during the lamination process, guidance of the layered sheets 18, 18' during the sewing operation can be negatively affected if the cutouts are made too wide, because greater edgewise spans of the decorative layers 24 would be left unsupported on bottom and unconstrained on top.

After the joining operation, the opposing decorative surfaces of the two sheets of material 18, 18' are separated and flattened out to form the decorative covering 12, as illustrated in FIG. 6, with the respective sheets of material 18, 18' positioned on opposite sides of the seam 20. The illustrated covering 12 can be disposed over and attached to a substrate 14 to arrive at the vehicle interior panel 10 of FIG. 1. In some embodiments, at least a portion of each margin 22 is trimmed away before assembly to the substrate. In some cases, such a trimming step completely removes the alignment features and cutouts from the finished decorative covering 12. For example, the joined sheets of material 18, 18' may have their margins trimmed along a trim line parallel with the line of stitching 42 and spaced from the edges of the joined materials by a distance greater than the depth of the alignment features and less than the margin length (M). Such trimming may be performed before separating the opposing decorative surfaces and flattening the joined sheets into the decorative covering 12. In some embodiments, the trimming and the joining are performed simultaneously. For example, a trimming tool (e.g., a knife) may be positioned downstream from the sewing needle in the material feed direction to trim excess material from the margin as the sewing operation proceeds along the line of stitching.

While the respective edges of the sheets of material 18, 18' being joined in FIGS. 4 and 5 are straight edges, it should be noted that the seam 20 may be formed along sheets of material having curved edges and/or sheets of material having differently contoured edges. Indeed, in embodiments of vehicle interior panels in which the seam 20 is located along a contoured decorative side 16, the contours of the respective edges of the sheets of material that are joined to form the decorative covering 12 are usually different from each other, making the visibility of the alignment features 34 for proper alignment of the edges during joining even more important.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A sheet of material for use in making a decorative covering for a vehicle interior panel, the sheet of material comprising:
    a decorative layer having a decorative side, an opposite back side, and an edge extending along a perimeter of the sheet of material;
    a backing layer attached to the back side of the decorative layer and having a corresponding edge extending along the edge of the decorative layer;
    a plurality of alignment features spaced along the edge of the decorative layer in an edgewise pattern; and
    a plurality of cutouts formed along the corresponding edge of the backing layer, each cutout being located such that each alignment feature is visible through one of the cutouts when the sheet of material is viewed from the back side,
    wherein the sheet of material forms a portion of the decorative covering when joined at a seam with another different sheet of material having alignment features spaced in a matching edgewise pattern along an edge of the different sheet of material, and
    wherein the decorative layer is leather or imitation leather.

2. A sheet of material as defined in claim 1, wherein each alignment feature along the edge of the decorative layer is a notch.

3. A sheet of material as defined in claim 1, wherein each cutout has a shape different from a shape of each alignment feature that is visible therethrough.

4. A sheet of material as defined in claim 1, wherein each cutout has a width greater than a width of each alignment feature that is visible therethrough.

5. A sheet of material as defined in claim 1, wherein each cutout has a width that is at least twice a width of each alignment feature that is visible therethrough.

6. A sheet of material as defined in claim 1, wherein each cutout has a width that is at least three times and no more than five times a width of each alignment feature that is visible therethrough.

7. A sheet of material as defined in claim 1, wherein each cutout has a depth equal to a depth of each alignment feature that is visible therethrough.

8. A sheet of material as defined in claim 1, wherein each cutout has a projected area that is at least twice a projected area of each alignment feature that is visible therethrough.

9. A sheet of material as defined in claim 1, wherein each cutout has a projected area that is at least five times and not more than ten times a projected area of each alignment feature that is visible therethrough.

10. A sheet of material as defined in claim 1, wherein the backing layer is adhered to the back side of the decorative layer.

11. A sheet of material as defined in claim 1, wherein the alignment features and the cutouts are arranged along a curvilinear portion of the perimeter of the sheet of material.

12. A vehicle interior panel comprising a decorative covering formed from a first sheet of material joined with a different sheet of material at a seam with each of the sheets of material being on opposite sides of the seam, the first sheet of material comprising:
    a decorative layer having a decorative side, an opposite back side, and an edge extending along a perimeter of the first sheet of material;
    a backing layer attached to the back side of the decorative layer and having a corresponding edge extending along the edge of the decorative layer;
    a plurality of alignment features spaced along the edge of the decorative layer in an edgewise pattern; and
    a plurality of cutouts formed along the corresponding edge of the backing layer, each cutout being located such that each alignment feature is visible through one of the cutouts when the first sheet of material is viewed from the back side,
    wherein the different sheet of material has alignment features spaced in a matching edgewise pattern along an edge of the different sheet of material.

13. A sheet of material as defined in claim 12, wherein the decorative layer is leather or imitation leather.

14. A method of making a decorative covering for a vehicle interior panel, the method comprising the steps of:
    joining a first sheet of material to a different sheet of material at a seam; and
    aligning alignment features of the first sheet of material with alignment features of said different sheet of material during the step of joining, wherein the first sheet of material comprises:
    a decorative layer having a decorative side, an opposite back side, and an edge extending along a perimeter of the first sheet of material, wherein the alignment features of the first sheet of material are spaced along the edge of the decorative layer in an edgewise pattern;
    a backing layer attached to the back side of the decorative layer and having a corresponding edge extending along the edge of the decorative layer; and
    a plurality of cutouts formed along the corresponding edge of the backing layer, each cutout being located such that each alignment feature is visible through one of the cutouts when the first sheet of material is viewed from the back side,
    wherein the alignment features of the different sheet of material are spaced in a matching edgewise pattern along an edge of the different sheet of material.

15. The method of claim 14, wherein the backing layer is attached to the back side of the decorative layer before the step of joining, and wherein the alignment features of the first sheet of material are formed along the edge of the decorative layer and the cutouts are formed along the corresponding edge of the backing layer before the backing layer is attached to the back side of the decorative layer.

16. The method of claim 14, wherein the step of joining includes sewing.

17. The method of claim 14, further comprising the step of trimming away at least a portion of a margin of the joined sheets of material along a trim line spaced from said edges.

18. The method of claim 17, wherein the step of trimming includes removal of the alignment features of the joined sheets of material.

19. The method of claim 14, wherein the decorative layer is leather or imitation leather.

20. The method of claim 14, wherein each alignment feature along the edge of the decorative layer is a notch.

* * * * *